(12) United States Patent
Frolikov

(10) Patent No.: US 11,334,287 B2
(45) Date of Patent: May 17, 2022

(54) DATA STREAM IDENTIFICATION AND PROCESSING IN DATA STORAGE DEVICE

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 112 days.

(21) Appl. No.: 15/893,306

(22) Filed: Feb. 9, 2018

(65) Prior Publication Data

US 2019/0250847 A1    Aug. 15, 2019

(51) Int. Cl.
*G06F 3/06* (2006.01)

(52) U.S. Cl.
CPC .......... *G06F 3/0659* (2013.01); *G06F 3/0611* (2013.01); *G06F 3/0644* (2013.01); *G06F 3/0679* (2013.01)

(58) Field of Classification Search
None
See application file for complete search history.

(56) References Cited

U.S. PATENT DOCUMENTS

| 2015/0121503 | A1* | 4/2015 | Xiong | G06F 21/41 726/8 |
| 2015/0134857 | A1* | 5/2015 | Hahn | G06F 3/061 710/5 |
| 2015/0286438 | A1* | 10/2015 | Simionescu | G06F 12/0866 711/103 |

* cited by examiner

*Primary Examiner* — Charles Rones
*Assistant Examiner* — Jonah C Krieger
(74) *Attorney, Agent, or Firm* — Greenberg Traurig

(57) ABSTRACT

A computer system having a host in communication with a data storage device is coupled to the host via a peripheral bus and a host interface. The data storage device has a controller, non-volatile storage media; and firmware containing instructions configures the operations of the controller. The host transmits a sequence of commands to the storage device to read data items from, or write data items to, the non-volatile storage media. The storage device examines a subset of the commands to determine whether or not data items identified in the subset are addressed sequentially and optimizes processing of at least a portion of the sequence of commands based on a result of a determination of whether or not data items identified in the subset are addressed sequentially.

16 Claims, 2 Drawing Sheets

DATA STREAM IDENTIFICATION AND PROCESSING IN DATA STORAGE DEVICE

FIELD OF THE TECHNOLOGY

At least some embodiments disclosed herein relate to computer storage devices in general and more particularly but not limited to solid state drives (SSDs).

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

BRIEF DESCRIPTION OF THE DRAWINGS

The embodiments are illustrated by way of example and not limitation in the figures of the accompanying drawings in which like references indicate similar elements.

DETAILED DESCRIPTION

When a data stream to be processed by a storage device, such as a solid state drive (SSD), has a particular property, such as the data items in the data stream being access in a sequential order, the property can be used to optimize the operations in the storage device. In at least some embodiments disclosed herein, a storage device is configured to analyze the addresses of the data items in a data stream to detect such properties for the optimization of operations to be performed for the data stream. Thus, the host does not have to use resources to identify the properties and/or communicate the properties to the storage device.

Figure 1:
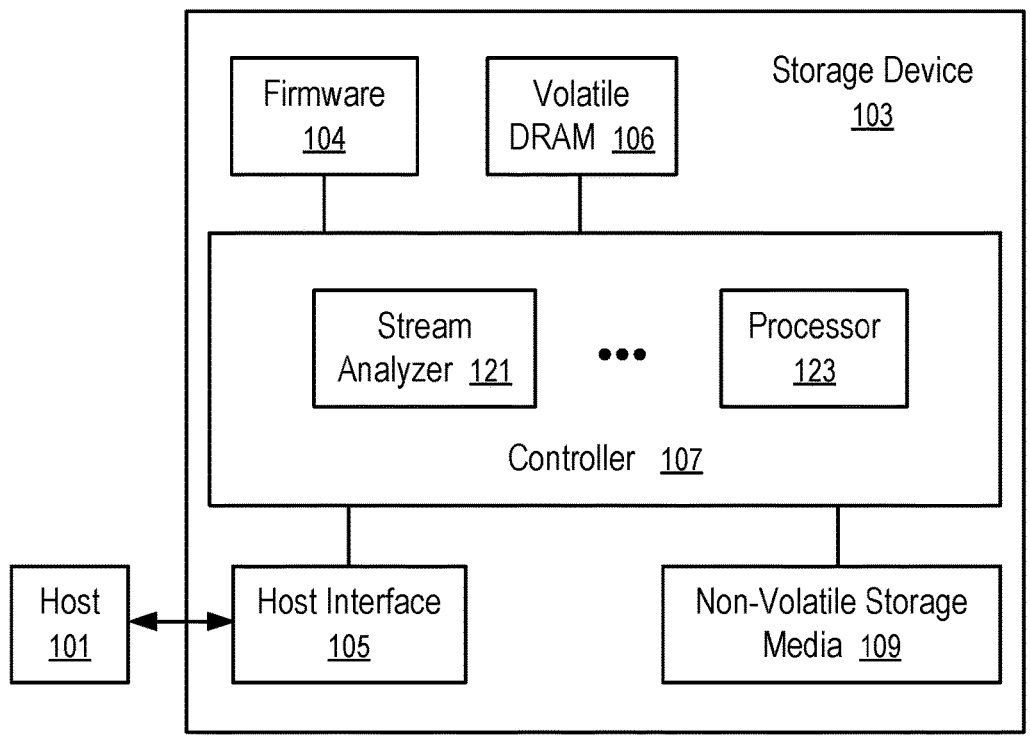
FIG. 1 shows a computer system having a data storage device configured to determine a characteristic of a data stream and process the data stream using the characteristic according to at some embodiments disclosed herein.

FIG. 1 shows a computer system having a data storage device configured to determine a characteristic of a data stream and process the data stream using the characteristic according to at some embodiments disclosed herein.

The computer system of FIG. 1 includes a storage device (103) attached to a host (101). The host (101) communicates a series of commands to access the storage device (103) for a stream of data. The storage device (103) has a stream analyzer (121) configured to analyze an initial set of the commands, detect a property of the data stream operated upon by the commands, and optimize the processing of the data stream in accordance with the detected property, without the host (101) specifying the property of the data stream.

For example, the host (101) may specify a set of commands to store, for a particular application running in an account, data items at logical addresses identified in the commands. The addresses of the data items may be sequential or non-sequential (e.g., substantially random).

For example, the host (101) may specify a set of commands to retrieve, for another application running in the same account (or the same particular application running in a different account), data items from logical addresses identified in the commands. The addresses of the data items may be sequential or substantially random.

In general, the stream of data items, being accessed for storage or retrieval in a sequence of commands from the host (101), may be characterized as sequential or random.

When the data stream is accessed randomly, the storage device (103) may cache the data items in volatile DRAM (106) for combination to improve access performance of non-volatile storage media (109) and/or reduce write amplification.

When the data stream is accessed sequentially, the storage device (103) may reliably predict the subsequent data access requests and optimize their storage or retrieval operations. For example, caching of the data items for combining can be reduced and/or eliminated.

To identify whether a data stream is sequential or random, the stream analyzer (121) examines the relations among the data items of an initial set of commands of the data stream.

For example, the stream analyzer (121) determines whether the data items of a predetermined number of initial commands of the data stream are addressed sequentially or randomly. If initial commands are addressed sequentially, the stream analyzer (121) identifies or labels the data stream as a sequential data stream; otherwise, the stream analyzer (121) identifies or labels the data stream as a random data stream.

Once a data stream is identified or labeled as a sequential data stream or a random data stream, the controller (107) processes the data stream according to whether or not the data stream is sequential or random.

In some instances, the stream analyzer (121) limits its analysis of whether a data stream is random or sequential to a predetermined number of initial commands of the data stream.

Alternatively, the stream analyzer (121) does not limit its analysis of whether a data stream is random or sequential to a predetermined number of initial commands of the data stream. After the type (e.g., sequential or random) of the data stream is determined from the initial commands of the data stream, the stream analyzer (121) further monitors the data stream to determine whether the type of the data stream has changed; and in response to a detected change in the type of the data stream, the stream analyzer (121) adjusts the label or identification of the data stream and causes a change in the optimization of the processing of the subsequent commands of the data stream.

In some instances, the stream analyzer (121) analyzes the commands of data stream in batches. For example, the stream analyzer (121) caches or queues up to a predetermined number of commands for a data stream and examines the commands to determine whether the data items in the commands are sequential or not. After the determination of the type of the stream of data items operated upon by the cached/queued commands, the stream analyzer (121)

releases the commands that have been analyzed as a batch for processing (e.g., by the processor (123)) and loads a new set of commands for analysis. The new set of commands and the released set of commands have no overlapping portions.

In other instances, the stream analyzer (121) continuously monitors a segment of commands of data stream. For example, the stream analyzer (121) queues or caches up to a predetermined number of commands in a first-in first-out buffer. The type of the data stream being operated upon is determined for the commands placed in the buffer. As one or more new commands are fetched for the data stream and pushed into the buffer, the one or more oldest commands are pushed out for processing. The stream analyzer (121) determined whether the one or more new commands are for data items sequential addressed in relation with the older commands in the buffer. When a change in the type of the data stream is detected via the predetermined number of commands in the buffer (e.g., from sequential to random, or from random to sequential), the stream analyzer (121) instructs the processor (e.g., 123) to adjust the optimization of the processing of the subsequent commands.

In some implementations, the host (101) is configured to separate commands directed to different data streams via different input/output submission queues.

For example, the host (101) and the storage device (103) may communicate with each other via message queues. A submission queue can be used by the host (101) to submit requests to the storage device (103); and a completion queue can be used by the host (101) to receive responses from the storage device (103). For example, a version of NVMe (e.g., Non-Volatile Memory Host Controller Interface Specification 1.2) specifies the use of a circular buffer with a fixed slot size for a submission queue or a completion queue.

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage device (103), commands to write data into the storage device (103), commands to compare data in the storage device (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the controller (107) of the storage device (103) fetch the commands/requests from a submission queue according to the order in which the commands are placed in the submission queue. However, the NVMe allows the controller (107) to execute the fetched commands in any order.

The host (101) may use different I/O submission queues for different applications and/or accounts. Thus, when the controller (107) retrieves a set of commands from an I/O submission queue, the set of commands can be considered as being directed to a same data stream.

In some instances, the stream analyzer (121) sorts the commands buffered for a data stream to determine whether or not the commands sorted in the buffer address data items sequentially in a logical address space. When an application addresses data items in a substantially sequential order, the stream analyzer (121) sorts the data requests in a sequential order to allow the application of optimization techniques for a sequential data stream.

In some instances, the data stream of an application may change from one type to another from time to time. Continuous monitoring of the data stream type allows the data access of the application to be best optimized without requiring the host (101) and/or the application to track the changes in data stream type.

The stream analyzer (121) can be implemented as part of the firmware (104) running in the one or more processors (e.g., 123) of a controller (107) of the storage device (103). Alternatively or in combination, the stream analyzer (121) can be implemented via a special purpose circuit.

The controller (107) of the storage device (103) may have multiple processors (121, . . . , 123). One or more of the processors (121, . . . , 123) can be configured to run one or more instances of the stream analyzer (121) (e.g., for analyses of different streams of commands).

The host (101) of FIG. 1 communicates with the storage device (103) via a communication channel having a predetermined protocol. In general, the host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The controller (107) of the storage device (103) runs firmware (104) to perform operations responsive to the communications from the host (101). Firmware in general is a type of computer program that provides control, monitoring and data manipulation of engineered computing devices.

In general, the non-volatile storage media (109) of the storage device (103) can be implemented as memory cells in an integrated circuit, or magnetic material coated on rigid disks. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/ storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has lower latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or the add-on modules (133) organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

Figure 2:
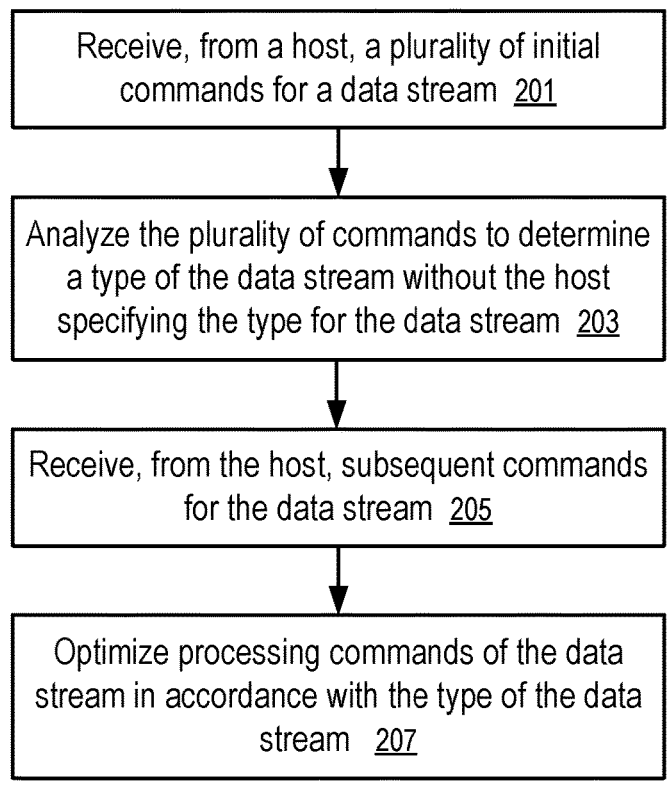
FIG. 2 shows a method implemented in a data storage device to process a data stream.

FIG. 2 shows a method implemented in a data storage device to process a data stream. For example, the method of FIG. 2 can be implemented in the storage device (103) in the system illustrated in FIG. 1.

The method of FIG. 2 includes: receiving (201), from a host (101), a plurality of initial commands for a data stream; analyzing (203) the plurality of commands to determine a type of the data stream without the host specifying the type for the data stream; receiving (205), from the host (101), subsequent commands for the data stream; and optimizing (207) processing commands of the data stream in accordance with the type of the data stream.

The optimizing can be performed for the subsequent commands and/or for the initial commands.

For example, the analysis (203) of the plurality of initial commands to determine the type of the data stream may be performed in parallel with the execution of the plurality of initial commands. The type of the data stream, as determined from the initial commands, can be used to optimize the processing of the subsequent commands.

For example, the analysis (203) of the plurality of initial commands to determine the type of the data stream may be performed before the execution of the plurality of initial commands. The type of the data stream, as determined from the initial commands, can be used to optimize the processing of the initial commands and/or the subsequent commands.

In some instances, the subsequent commands received from the host (101) are further analyzed to determine whether the type of the data stream has been changed in view of the subsequent commands. In response to a change of the type of the data stream, the optimization of command processing for the data stream is adjusted according to the changed type of the data stream.

Figure 3:
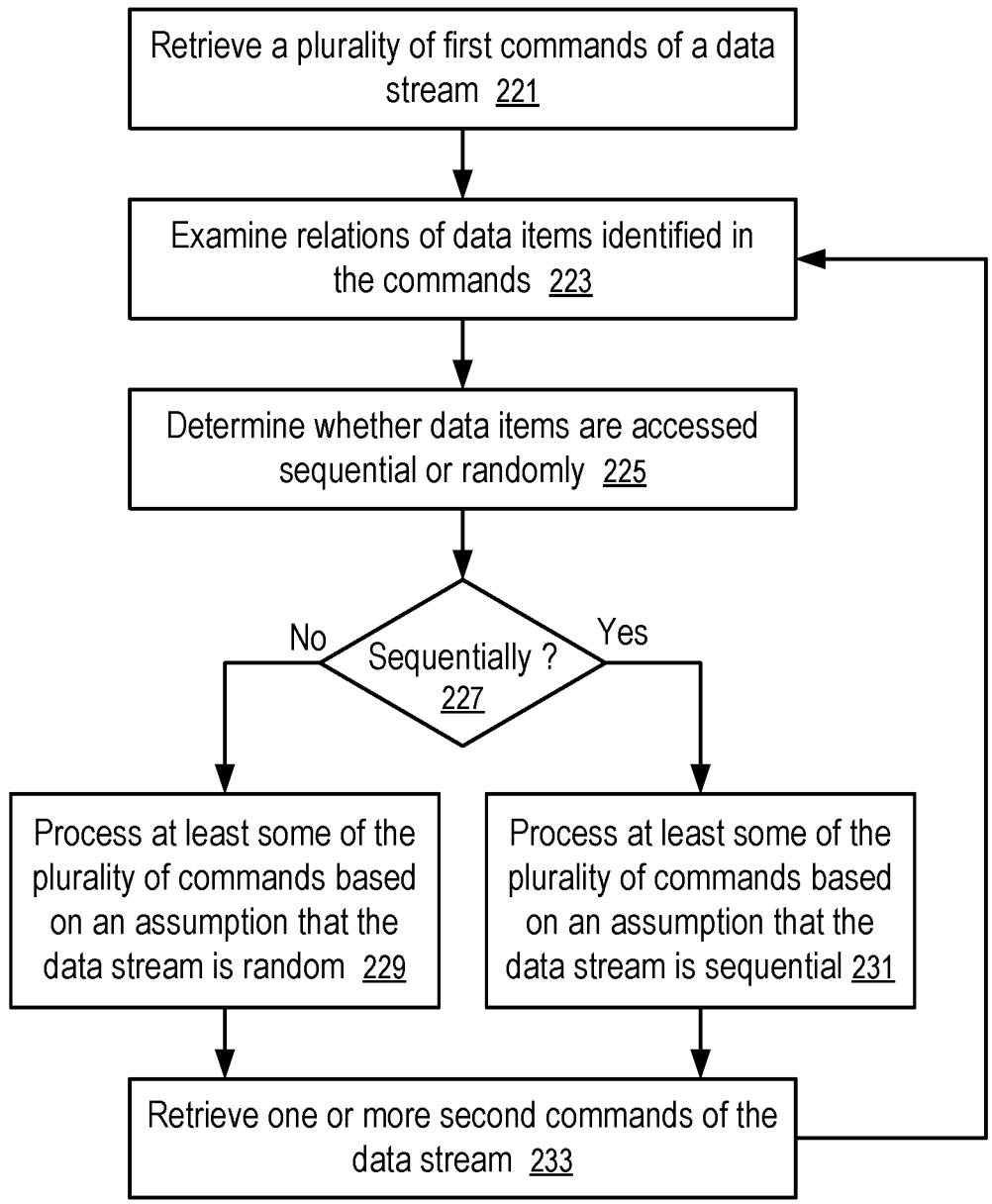
FIG. 3 shows a detailed method to process a stream of data access commands.

FIG. 3 shows a detailed method to process a stream of data access commands. For example, the method of FIG. 3 can be implemented in the system of FIG. 1 and/or used to implement the method of FIG. 2.

The method of FIG. 3 includes: retrieving (221) a plurality of first commands of a data stream; examining (223) relations of data items identified in the commands; determining (225) whether data items are accessed sequentially or randomly.

If it is determined (227) that the data items are not accessed sequential, the method of FIG. 3 further includes processing (229) at least some of the plurality of commands based on an assumption that the data stream is random.

If it is determined (227) that the data items are accessed sequential, the method of FIG. 3 further includes processing (231) at least some the plurality of commands based on an assumption that the data stream is sequential.

The method of FIG. 3 includes retrieving (233) one or more second commands of the data stream. Commands that have been processed (229 or 231) are removed from the set of commands for the examination (223); and the retrieved second commands are added to replace the removed commands for the examination (223). The addition of the second commands may change the result of the subsequent determination (225) of whether the data items in the set under examination (223) are accessed sequentially or randomly. The result of the determination (227) can be used to adjust the optimization (e.g., 229 and 231) for the processing of at least some of the commands of the data stream.

For example, a computer system (e.g., as illustrated in FIG. 1) includes a host (101) coupled to a storage device (103) via a peripheral bus, such as a peripheral component interconnect express bus in accordance with a non-volatile memory host controller interface specification for the communications between the host (101) and the storage device (103).

The storage device (103) may be a solid state drive having a host interface (105) in communication with the host (101), a controller (107), non-volatile storage media (109), and firmware (104) containing instructions executable by the controller (107). The controller (107) is configured at least in part via the instructions in the firmware (104).

The host (101) transmits a sequence of commands to the storage device (103) via an input/output submission queue (e.g., to store data in the non-volatile storage media (109), or to retrieve data from the non-volatile storage media (109), for an application running in a user account in the host (101)).

The storage device (103) is configured (e.g., via the firmware (104)) to examine a subset of the commands submitted by the host (101), determine whether or not data items identified in the subset are addressed sequentially in a logical address space, and optimizes the processing of at least a portion of the sequence of commands based on a result of a determination of whether or not data items identified in the subset are addressed sequentially.

For example, the commands from the host (101) identify locations of data items using logical addresses for storage in or for retrieval from the non-volatile storage media (109); and the storage device (103) determines whether or not the data items identified in the subset of commands are addressed sequentially using the logical addresses based on whether or not the logical addresses of data items in the subset are sequential.

In some instances, the storage device (103) sorts the commands in the subset according to the logical addresses of the data items identified in the commands of the subset to determine whether the sorted logical addresses are sequential. The commands in the subset being examined may be allowed to have omissions of less than a threshold number of counts of sequential logical addresses and still be recognized as sequential. Thus, a substantially sequential data stream can be sorted (and optionally augmented) to become a sequential data stream and processed as a sequential data stream (e.g., when the data access performance of processing such a substantially sequential data stream as a sequential data stream is better than processing it as a random data stream).

For example, a buffer having a size for a predetermined number of input/output commands can be used to store a moving segment of the sequences of commands retrieved from an I/O submission queue of the host (101). The commands within the buffer are sorted according to logical addresses specified in the commands held within the buffer. The sorted commands are examined to determine whether or not the data items to be stored or retrieved via the commands are sequential.

When the commands in the buffer are sequential (or substantially sequential with one or more gaps that are small than a threshold), the commands in the buffer are processed as commands for a sequential data stream. As commands in the buffer are dispatched for processing, new commands are retrieved from the I/O submission queue and added to the buffer. New commands are sorted within the buffer according to the same ascending or descending order of their virtual addresses as the commands that have been dispatched for processing. Upon the old sequential commands are all dispatched, it is determined whether or not the new commands in the buffer are sequential following the old commands and/or whether the new commands starts a new set of sequential accessing commands.

When the commands in the buffer appear to be random (e.g., having more than a threshold number of gaps or having more than a threshold number of missing addresses), the commands in the buffer are processed as commands operating on a random data stream. New commands retrieved from the I/O submission queue are added to the buffer to detect a change of data stream from random to sequential.

Thus, data access requests/commands having mixed random streams and sequential streams can be automatically detected and processed optimally via the use of the stream analyzer (121), without a need for the host (101) to explicitly separate them.

In some arrangements, the analysis of the commands in the buffer is performed in parallel with the processing of the commands. The analysis result is used as a prediction of the stream characteristic of subsequent commands. When the sequential or random characteristic of the commands in the buffer is determined, the identification of the sequential or random characteristic is used for the processing of the subsequent commands. While the subsequent commands are processed according to the stream characteristic prediction, the subsequent commands are further analyzed to confirm the prediction and detect a possible change in the characteristic of the commands. If a change is detected, the change is applied to the processing of further commands retrieved from the I/O submission queue.

Preferably, the host (101) places commands operating on different data streams in different input/output (I/O) submission queues. For example, data access commands from different applications running in different accounts can separate from each other by using different (I/O) submission queues.

Alternatively or in combination, the commands generated from different contexts (e.g., by different applications and/or from different accounts) have different identifiers that can be used to tell apart the different contexts. Thus, the storage device (103) uses the context identifiers to sort the commands into separate sets of commands for different data streams.

A non-transitory computer storage medium can be used to store instructions of the firmware (104) and/or the add-on modules (133). When the instructions are executed by the controller (107) of the computer storage device (103), the instructions cause the controller (107) to perform a method discussed above.

In the present disclosure, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer system, comprising:
    a host; and
    a storage device having:
        a host interface in communication with the host;
        a controller;
        a non-volatile storage media; and
        firmware containing instructions executable by the controller;
    wherein the host transmits a sequence of commands to the storage device; and
    wherein the storage device is configured to, independently from the host, sort a subset of the commands according to address,
        examine a predetermined number of commands in the subset in an order sorted according to address,
        determine, based on the commands in the subset in the order sorted according to address, whether or not data items identified in the subset are addressed sequentially, and optimize, by the storage device, processing of at least a portion of the sequence of commands in the subset, and commands following the subset, based on a result of a determination of whether or not data items identified in the subset are addressed sequentially.

2. The computer system of claim 1, wherein the processing of the commands following the subset is optimized based on the result of the determination of whether or not data items identified in the subset are addressed sequentially without determining whether or not the commands following the subset address data items sequentially.

3. The computer system of claim 1, wherein the storage device continuously monitors commands of the predetermined number to determine whether or not data items identified in the commands of the predetermined number being monitored are addressed sequentially.

4. The computer system of claim 1, further comprising: a communication bus coupled between the host and the storage device.

5. The computer system of claim 4, wherein the communication bus is a peripheral component interconnect express bus.

6. The computer system of claim 5, wherein the host communicates with the storage device in accordance with a non-volatile memory host controller interface specification.

7. The computer system of claim 6, wherein the storage device is a solid state drive.

8. The computer system of claim 1, wherein the host places commands directed to different data streams in different input/output submission queues.

9. The computer system of claim 8, wherein the data streams correspond to data access requests from different running instances of one or more applications.

10. The computer system of claim 8, wherein the data streams correspond to data access requests from different user accounts.

11. The computer system of claim 1, wherein the sequence of commands read data items from the non-volatile storage media of the storage device.

12. A method implemented in a computer system, the method comprising:
    receiving, in a storage device coupled to a host, a sequence of commands submitted from the host, the storage device having:
        a host interface in communication with the host;
        a controller;
        a non-volatile storage media; and
        firmware containing instructions executable by the controller;
    sorting, by the controller of the storage device executing the firmware, a subset of the commands according to address;
    examining, by the controller of the storage device executing the firmware, a predetermined number of commands in the subset in an order sorted according to address to determine whether or not data items identified in the subset in the order are addressed sequentially; and
    optimizing, by the controller of the storage device independent of the host, processing of at least a portion of the sequence of commands in the subset, and commands following the subset, based on a result of a determination of whether or not data items identified in the subset are addressed sequentially.

13. The method of claim 12, wherein the commands in the sequence write data items into the non-volatile storage media of the storage device.

14. The method of claim 12, wherein the commands in the sequence identify locations of data items to be stored or retrieved using logical addresses.

15. The method of claim 12, wherein whether or not data items identified in the subset are addressed sequentially is determined based on whether or not logical addresses of data items in the subset are sequential.

16. A non-transitory computer storage medium storing instructions which, when executed by a computer system, cause the computer system to perform a method, the method comprising:
    receiving, in a storage device coupled to a host, a sequence of commands submitted from the host, the storage device having:
        a host interface in communication with the host;
        a controller;
        a non-volatile storage media; and
        firmware containing instructions executable by the controller;
    sorting, by the controller of the storage device executing the firmware, a subset of the commands according to address;
    examining, by the controller of the storage device executing the firmware, a predetermined number of commands in the subset in an order sorted according to address to determine whether or not data items identified in the subset in the order are addressed sequentially; and
    optimizing, by the controller of the storage device independent of the host, processing of at least a portion of the sequence of commands in the subset, and commands following the subset, based on a result of a determination of whether or not data items identified in the subset are addressed sequentially.

* * * * *